United States Patent
Arndt et al.

(10) Patent No.: US 9,454,405 B2
(45) Date of Patent: Sep. 27, 2016

(54) PAGING PARTITION ARBITRATION OF PAGING DEVICES TO SHARED MEMORY PARTITIONS

(75) Inventors: Richard L. Arndt, Austin, TX (US);
Carol B. Hernandez, Austin, TX (US);
Kyle A. Lucke, Oronoco, MN (US);
Timothy R. Marchini, Hyde Park, NY (US); Naresh Nayar, Rochester, MN (US); James A. Pafumi, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 1471 days.

(21) Appl. No.: 12/414,441

(22) Filed: Mar. 30, 2009

(65) Prior Publication Data
US 2010/0250863 A1   Sep. 30, 2010

(51) Int. Cl.
*G06F 12/00* (2006.01)
*G06F 9/50* (2006.01)
*G06F 11/20* (2006.01)

(52) U.S. Cl.
CPC ......... *G06F 9/5077* (2013.01); *G06F 11/2094* (2013.01)

(58) Field of Classification Search
CPC ................. G06F 9/5077; G06F 11/2094
USPC ........................................................ 711/173
See application file for complete search history.

(56) References Cited

U.S. PATENT DOCUMENTS

| | | | |
|---|---|---|---|
| 6,041,366 A * | 3/2000 | Maddalozzo et al. | 710/5 |
| 6,167,490 A | 12/2000 | Levy et al. | |
| 6,519,660 B1 * | 2/2003 | Rooney | 710/38 |
| 6,526,492 B1 * | 2/2003 | McBrearty et al. | 711/170 |
| 2002/0016812 A1 * | 2/2002 | Uchishiba et al. | 709/104 |
| 2003/0177313 A1 * | 9/2003 | Iyer et al. | 711/129 |
| 2007/0067366 A1 | 3/2007 | Landis | |
| 2009/0307690 A1 * | 12/2009 | Logan et al. | 718/1 |

OTHER PUBLICATIONS

Author: H.Chen; Title: A Transparent Remote Paging Model for Virtual Machines; Item: Paper; Date: Sep. 2008; pp. 8; Publisher: Dept. of Computer Science and Technology, Peking University, P.R. China; Location: http://www.cs.mtu.edu/~zlwang/papers/iwvt08.pdf.

(Continued)

*Primary Examiner* — Larry Mackall
(74) *Attorney, Agent, or Firm* — Joseph Petrokaitis; Robert C. Rolnik (57) ABSTRACT

Disclosed is a computer implemented method, computer program product, and apparatus to establish at least one paging partition in a data processing system. The virtualization control point (VCP) reserves up to the subset of physical memory for use in the shared memory pool. The VCP configures at least one logical partition as a shared memory partition. The VCP assigns a paging partition to the shared memory pool. The VCP determines whether a user requests a redundant assignment of the paging partition to the shared memory pool. The VCP assigns a redundant paging partition to the shared memory pool, responsive to a determination that the user requests a redundant assignment. The VCP assigns a paging device to the shared memory pool. The hypervisor may transmit at least one paging request to a virtual asynchronous services interface configured to support a paging device stream.

11 Claims, 7 Drawing Sheets

(56) References Cited

OTHER PUBLICATIONS

Schubert, Jeffrey S; Arrangements for I/O Control in a Virtualized System; Dec. 10, 2009; U.S. Appl. No. 12/135,943; USPTO.

Lee, Chun Kuan; Office Action; Mar. 29, 2010; U.S. Appl. No. 12/135,943; USPTO.

Schubert, Jeffrey S; Response to Non-Final Office Action; Jun. 23, 2010; U.S. Appl. No. 12/135,943; USPTO.

Lee, Chun Kuan; Final Office Action; Aug. 10, 2010; U.S. Appl. No. 12/135,943; USPTO.

Schubert, Jeffrey S; Preliminary Amendment Accompanying an RCE and Interview Summary; Nov. 10, 2010; U.S. Appl. No. 12/135,943; USPTO.

Walder, Stephen J.; On-Demand Allocation of Virtual Asynchronous Services Interfaces; Nov. 12, 2008; U.S. Appl. No. 12/269,097; USPTO.

Zehrer, Matthew; Shared Memory Partition Data Processing System With Hypervisor Managed Paging; U.S. Appl. No. 12/403,459; USPTO.

Larry T. Mackall, Office Action, Jun. 20, 2012.

Robert C. Rolnik, Response to Office Action, Sep. 20, 2012.

Larry T. Mackall, Office Action2, Jan. 25, 2013.

Robert C. Rolnik, Office Action2, Apr. 19, 2013.

Larry T. Mackall, Final Office Action, Aug. 21, 2013.

Robert C. Rolnik, Response to Final Office Action, Sep. 4, 2013.

Larry T. Mackall, Notice of Allowance, Sep. 30, 2013.

* cited by examiner

| POOL IDENTIFIER | DEVICE IDENTIFIER | STREAM IDENTIFIER | VRM STATE | REDUNDANCY | STORAGE TYPE |
|---|---|---|---|---|---|
| 411 | 412 | 413 | 414 | 415 | 416 |
| SERVER-824-E8A-SN10FE401 | amspaging01 | 123456 | ACTIVE | YES | PHYSICAL VOLUME |
| SERVER-824-E8A-SN10FE402 | amspaging02 | 123458 | ACTIVE | NO | LOGICAL VOLUME |
| 421 | 422 | 423 | 424 | 425 | 426 |

| | hmc-p550: Memory Pool Management | | | □ □ ✕ |
|---|---|---|---|---|
| Device Filter - Server-8204-E8A-SN10FE401 | | | | |

Device Type: [All ▼]

☐ Maximum Size (in MBs) [0]

☐ Minimum Size (in MBs) [0]

[Refresh]

Choose from the following list of devices. You can choose more than one device to be added to the pool. After you have made your selections select OK button.

Device List:

811     812

| Select | VIOS Devices | Device Name | Device Size | Device Status |
|---|---|---|---|---|
| ☑ | vios01 | amspaging01 | 10240 | - |
| ☑ | vios01 | amspaging02 | 10240 | - |
| ☐ | vios01 | hdisk3 | 140013 | - |
| ☐ | vios01 | hdisk4 | 140013 | - |
| ☐ | vios01 | hdisk5 | 140013 | - |

801

[OK] [Cancel] [Help]

Done     🔒 Internet

FIG. 8

PAGING PARTITION ARBITRATION OF PAGING DEVICES TO SHARED MEMORY PARTITIONS

BACKGROUND OF THE INVENTION

1. Field of the Invention

The present invention relates generally to a computer implemented method, data processing system, and computer program product for configuring and coordinating components of virtualized data processing systems. More specifically, the present invention relates to virtual memory sharing.

2. Description of the Related Art

Data processing systems are continuously improved such that memory, storage, and processing generally become cheaper year-to-year. Conversely, a more powerful set of hardware features can be built today as a data processing system for the same price of a data processing system having half as many physical resources during a prior year. This rate of advancement is frequently referred to as Moore's law.

Accordingly, conventional operating systems and their client applications can occupy a fraction of a data processing system's resources, and still function in an efficient manner. Data center operators have taken advantage of the availability of surplus physical resources by installing multiple operating systems each within their own logical partitions of the data processing system. A logical partition is an operating system image executing instructions on a data processing system in a manner that permits allocation of excess operating system resources to a parallel or peer operating system image. Operating systems that may be configured to operate in a logical partition include, for example, IBM i®, z/OS®, AIX®, Linux®, among others. IBM i®, z/OS®, and AIX® are registered trademarks of International Business Machines Corporation. Linux® is a registered trademark of Linus Torvalds.

One approach to organizing logical partitions is to allocate a fixed amount of memory and disk space to each logical partition. However, due to varying processing loads in each logical partition, data center operators have found that much system capacity is under-utilized by each logical partition during various periods of the day. Accordingly, efforts have been made to dynamically allocate resources to each logical partition in response to the processing loads of each logical partition in relation to peer logical partitions hosted on the same data processing system.

A typical solution to efficiently use the resources is to virtualize memory functions. One way to provide virtualized memory functions is by paging memory or swapping memory between random access memory and its slower counterpart, disk storage. A page can be paged-in to memory from storage, or paged out from memory to storage. A "page" is a contiguous block of memory of a certain size where a system manages units or blocks of memory the size of a page. Pages can have a uniform size or segment, for example, 4096 bytes. A page is generally the smallest segment or unit of translation available to an OS. Accordingly, a page can be the standardized segment of data that can be moved and processed by the data processing system.

A paging device is a physical or logical device used for paging memory into physical memory. A paging device can be a local disk, network addressed storage, flash memory, and the like. A paging device can be responsive to requests made from software components of a data processing system, such as, a Virtual I/O Server (VIOS). A Virtual I/O Server can provide virtual SCSI target and Shared Ethernet Adapter capability to client logical partitions within the system.

Thus, in systems that rely on virtual memory, the memory function emulates real memory with virtual memory pages. Such virtual memory pages can reside in either physical memory or in storage. Accordingly, due to the availability of storage used to support and emulate memory, the virtual memory may exceed a data processing system's physical memory.

The allocation of virtual memory to each client partition can be challenging. Moreover, issues concerning priority access to virtual memory backed to physical memory can also determine a speed with which a client partition can operate. In addition, due to the mechanical wear issues associated with disk storage, the provision of redundancy is a focus where a client partition requires robust and reliable access to data.

SUMMARY OF THE INVENTION

The present invention provides a computer implemented method, computer program product, and apparatus to establish at least one paging partition in a data processing system. The virtualization control point (VCP) reserves up to the subset of physical memory for use in the shared memory pool. The VCP configures at least one logical partition as a shared memory partition. The VCP assigns a paging partition to the shared memory pool. The VCP determines whether a user requests a redundant assignment of the paging partition to the shared memory pool. The VCP assigns a redundant paging partition to the shared memory pool, responsive to a determination that the user requests a redundant assignment. The VCP assigns a paging device to the shared memory pool. The hypervisor may transmit at least one paging request to a virtual asynchronous services interface configured to support a paging device stream.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
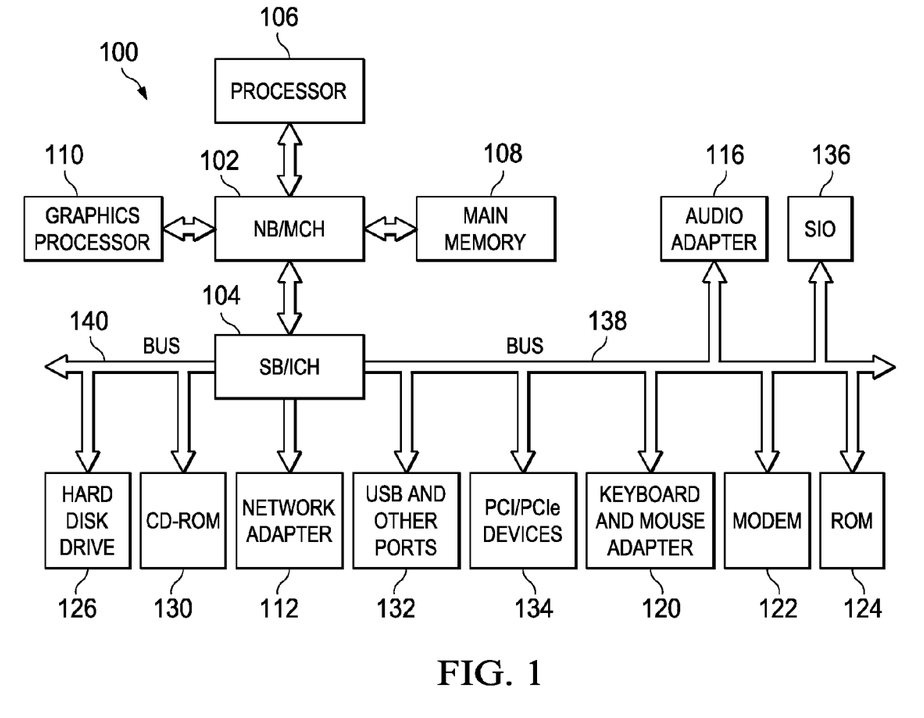
FIG. 1 is a data processing system in accordance with an illustrative embodiment of the invention.

With reference now to the figures and in particular with reference to FIG. 1, a block diagram of a data processing system is shown in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106, coordinates, and provides control of various components within data processing system 100 in FIG. 1. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100. Java™ is a trademark of Sun Microsystems, Inc. in the United States, other countries, or both.

Instructions for the operating system, the object-oriented programming system, and applications or programs are located on storage devices, such as hard disk drive 126, and may be loaded into main memory 108 for execution by processor 106. The processes of the present invention can be performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A network adapter can be, for example, a fibre channel adapter, an Ethernet adapter, and the like. A memory may be, for example, main memory 108 or a cache such as found in north bridge and memory controller hub 102. A processing unit may include one or more processors or CPUs. The depicted example in FIG. 1 is not meant to imply architectural limitations. For example, data processing system 100 also may be a tablet computer, laptop computer, or telephone device in addition to taking the form of a PDA.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module", or "system." Furthermore, the present invention may take the form of a computer program product embodied in any tangible medium of expression having computer usable program code embodied in the medium.

Any combination of one or more computer usable or computer readable medium(s) may be utilized. The computer readable medium may be a computer readable storage device. The term "computer readable storage device" does not encompass a signal propagation media. The computer-usable or computer-readable storage device may be, for example but not limited to, an electronic, magnetic, optical, electromagnetic, or semiconductor system, apparatus, device, or any suitable combination of the foregoing. More specific examples (a non-exhaustive list) of the computer-readable storage device would include the following: a portable computer diskette, a hard disk, a random access memory (RAM), a read-only memory (ROM), an erasable programmable read-only memory (EPROM or Flash memory), a portable compact disc read-only memory (CDROM), an optical storage device. Note that the computer-usable or computer-readable device could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable storage device may be any tangible device that can contain or store the program for use by or in connection with the instruction execution system, apparatus, or device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus, and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The aspects of the illustrative embodiments provide a computer implemented method, data processing system, and computer program product for establishing at least one paging partition in a data processing system. Accordingly, one or more paging partitions may be assigned to support a shared memory pool. One or more paging devices, such as disks, may support each paging partition. Accordingly, a paging partition, once so configured, can handle paging requests of the shared memory pool, and page-in or page-out, as directed in such paging requests, data accessible within one or more disks. A paging device assigned to a shared memory pool holds page frames that are not currently resident in the shared memory pool. Paging devices assigned to the shared memory pool, explained below, are accessed through the Virtual I/O Server (VIOS). These paging devices are used to support the overcommitment of physical memory which is shared among several partitions. In a virtual system, as described herein, paging devices can be configured to the operating system (OS) for OS paging. Paging devices configured to the paging virtual I/O server and assigned to the shared memory pool can be used for hypervisor paging. A Virtual I/O Server can provide virtual SCSI target and Shared Ethernet Adapter capability to client logical partitions within the system.

Figure 2:
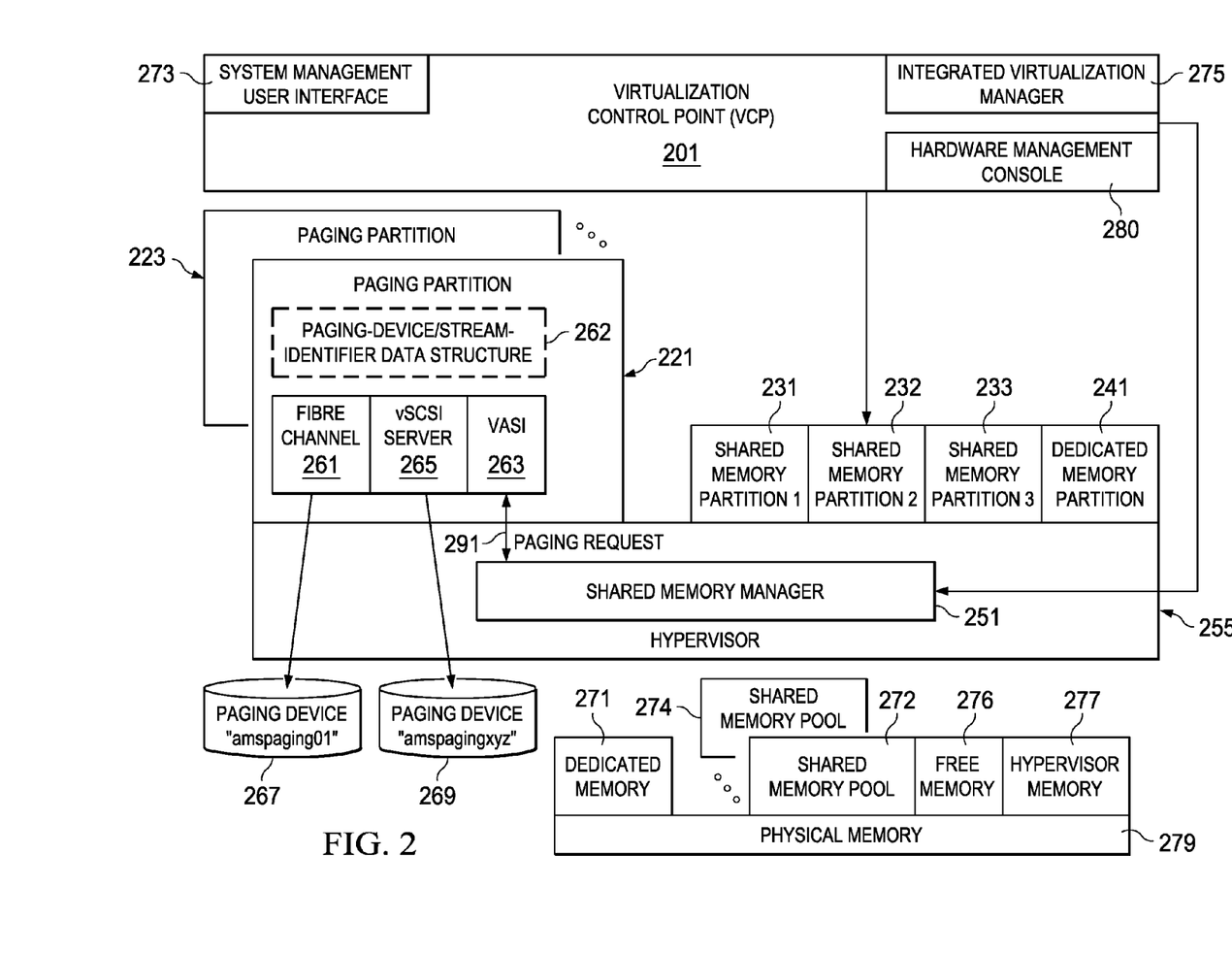
FIG. 2 is a diagram of software components and supporting hardware of a data processing system in accordance with an illustrative embodiment of the invention.

FIG. 2 is a diagram of software components and supporting hardware of a data processing system in accordance with an illustrative embodiment of the invention. The data processing system may be, for example, data processing system 100 of FIG. 1. Accordingly, paging device 267 and paging device 269 can be hard disk drive 126 of FIG. 1. In addition, physical memory 279 may be main memory 108 of FIG. 1. A virtualization control point (VCP) 201 includes a system management user interface 273 that receives user selections to create and configure one or more shared memory pools. A VCP can reside within or be provided by an Integrated Virtualization Manager (IVM) such as, IVM 275. VCPs by default may cause newly created paging devices to be logical volumes in response to user requests to create a paging device. Alternatively, a VCP can reside within or be provided by Hardware Management Console (HMC) 280.

A shared memory pool is a portion of physical memory set aside to be shared among a set of partitions, such as, for example, shared memory partitions 231, 232, and 233. The shared memory pool is managed by a shared memory manager. The physical memory that makes up a shared memory pool is only available to those partitions that are defined as shared memory partitions.

VCP 201 may be used to allocate, configure, and integrate physical resources to software components. Physical resources can include paging devices 267, 269, and physical memory 279. Software components can include partitions, memory pools and memory managers. In this example, partitions include paging partitions 221, 223, shared memory partition 1 231, shared memory partition 2 232, shared memory partition 3 233, and dedicated memory partition 241. Memory pools include dedicated memory 271, shared memory pool 272, shared memory pool 274, free memory 276, and hypervisor memory 277.

A memory manager can be shared memory manager 251. A shared memory manager provides access to data. Such data can be kernel space memory or user space memory. The shared memory manager can supply memory allocations for shared memory partitions. A shared memory manager can be a part of a hypervisor 255. The hypervisor can determine how to handle situations when the occupied space of the physical memory 279 is either full, or reaches a preset threshold. An ideal situation involves the hypervisor placing in physical memory 279 each virtual memory page in advance of a processor operating on such a virtual memory page. In practice, though, a processor may require such a virtual memory page before the virtual memory page is placed into physical memory 279. The shared memory manager uses a paging partition to access data belonging to a shared memory partition that resides on a paging device assigned to the shared memory pool.

A paging VIOS partition or paging partition manages the paging devices assigned to the shared memory pool in response to requests from the virtualization control point (VCP). Such requests may be dispatched from the IVM 275. An alternative embodiment may rely on HMC 280 to dispatch such requests instead of IVM 275. Thus, a paging partition is a software component that maintains a list of paging devices configured to service each shared memory pool in support of the shared memory function. The paging partition (Virtual I/O server) is a partition trusted by the hypervisor that is used to enable sharing of physical I/O resources across partitions. By having the paging partition do the paging, the I/O support can be decoupled from the hypervisor without compromising security. Accordingly, cost reductions are possible since different types of storage can be used as paging devices without changes to the hypervisor layer. Each paging partition is provisioned to include interfaces for transmitting and receiving data in response to paging requests sent by the shared memory manager. The interfaces can include, for example, a fibre channel 261, which is a driver that provides access to disks in the storage area network (SAN). The interfaces can also include a Virtual SCSI driver to provide access to SCSI-attached disks. The paging partition receives paging requests from the shared memory manager through a virtual asynchronous services interface (VASI) or VASI adapter, such as VASI 263. A VASI is a virtual device that provides a communication path between the shared memory manager and a paging partition. VASI 263 is configured to support multiple paging device streams, which are further defined in paging-device/stream-identifier data structure 262. A paging device stream is required for each paging device assigned to the shared memory pool. The manner in which the paging device stream is bound to the paging device is explained further below with reference to FIG. 5B. A paging device stream is a communication channel within the VASI adapter that carries the information associated with a paging request, such as paging request 291. The paging request can include one or more pointers to data buffers. A paging request is a request sent to the VASI adapter to request paging-in of data from a paging device, or paging-out of data from physical memory. Shared memory manager 251 transmits paging request 291 to the VASI adapter 263. The VASI can also respond to the shared memory partition by sending status information and other signals in response to requests from the shared memory partition.

Each paging partition, when configured to support one or more shared memory pools relies on a paging-device/stream-identifier data structure, for example, as described further below in relation to FIG. 4. When a user assigns a paging device to a shared memory pool, the VCP may respond by assigning a stream identifier to the paging device. In addition, the VCP can command the paging partition to create the paging-device/stream-identifier data structure. In addition, the vSCSI or virtual SCSI, such as vSCSI server 265, is a driver for SCSI adapters that interface to SCSI disks. A SCSI disk can be, for example, paging device 269, "amspagingxyz".

Figure 3:
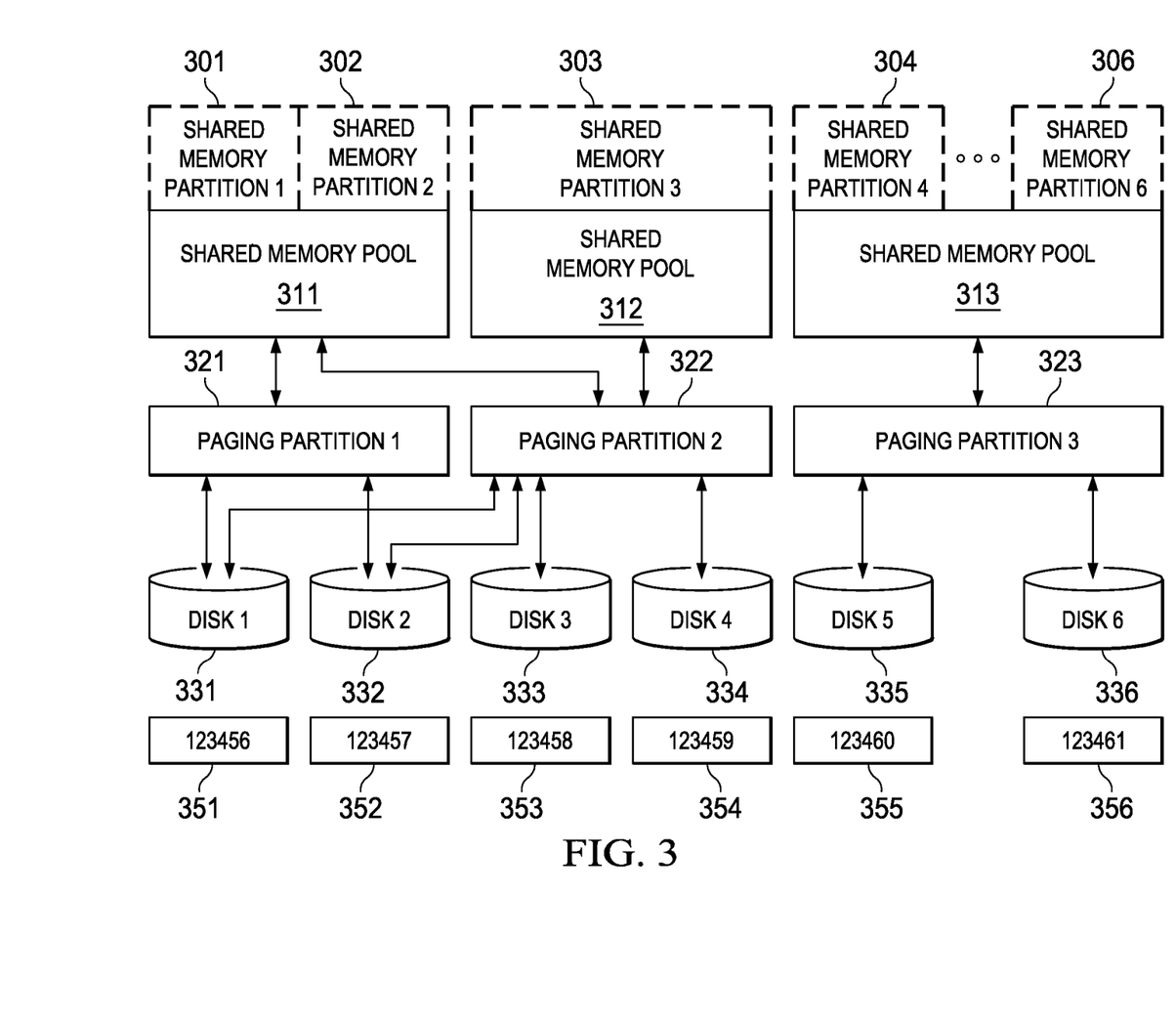
FIG. 3 is an example of possible paging partition assignment to a shared memory pool in accordance with an illustrative embodiment of the invention.

FIG. 3 is an example of possible paging partition assignment to a shared memory pool in accordance with an illustrative embodiment of the invention. FIG. 3 shows a configuration of three paging partitions that can be a reconfigured version of software components and supporting hardware of FIG. 2. Six disks 331, 332, 333, 334, 335, and 336 are accessed by one or more paging partitions 321, 322, and 323. It is appreciated that a disk can be a solid state disk or any other paging device. Similarly, each paging partition may service or support one or more shared memory pools 311, 312, and 313. In a similar manner, each shared memory pool may have one or more shared memory partitions 301, 302, 303, 304, and 306, as well as others not shown. A paging request is a command sent by the hypervisor to the paging partition to initiate a page-in or page-out operation for a particular page in the shared memory pool. A paging request describes an operation that transfers data between memory associated with a shared memory partition and the partition's paging device. A paging request specifies the paging device stream ID for the partition's paging device, the paging device offset, and the size for the transaction. The paging partition performs reads from and writes to the partition's paging device in response to page in and page out requests, respectively. The shared memory manager can be, for example, shared memory manager 251 of FIG. 2.

For example, shared memory partition 301 is supported by a redundant paging partition configuration comprised of paging partition 1 321 and paging partition 2 322. Paging partition 1 321 may be an active paging partition, while paging partition 2 322 may be a standby paging partition, with respect to shared memory pool 311. A hypervisor may send paging requests to only one among the redundant paging partitions at a time. In a similar manner, a paging partition may have redundant paging devices upon which it relies. Accordingly, a VASI adapter can support multiple streams of operations or paging streams, where the VASI is within a paging partition having such paging device redundancy.

Figure 4:
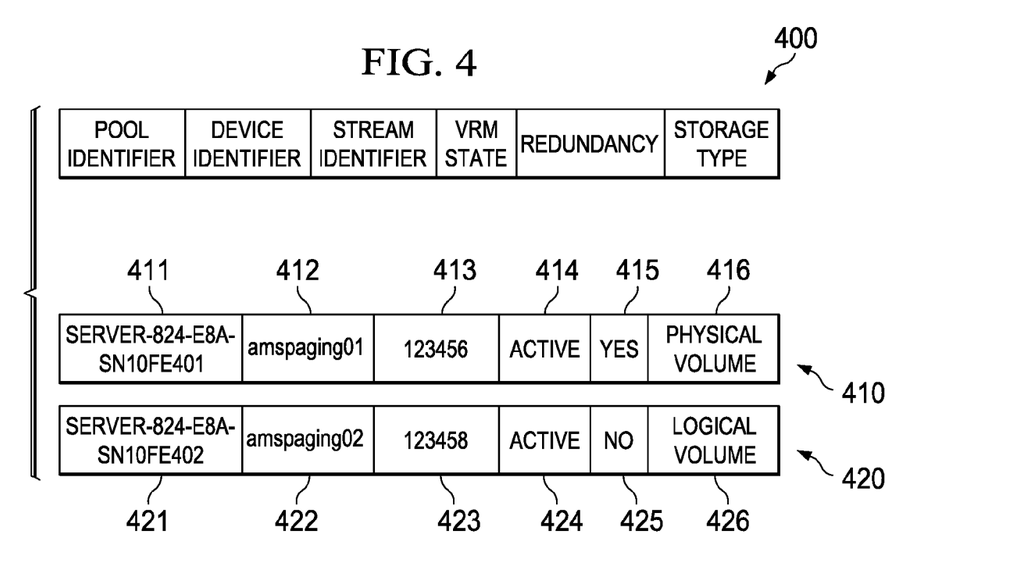
FIG. 4 is a data structure model and example of data populating a paging device and stream identifier data structure in accordance with an illustrative embodiment of the invention.

FIG. 4 is a data structure model and example of data populating a paging device and stream identifier data structure in accordance with an illustrative embodiment of the invention. The data in paging device and stream identifier data structure is as defined by structure functionality template 400. The data of the paging device and stream identifier data structure may be stored according to an object data management (ODM) format. The paging device and stream identifier data structure can be, for example, paging-device/stream-identifier data structure 262, of FIG. 2. In the example record 410 of paging device "amspaging01", the paging partition, is identified as part of a redundant set of paging partitions with "yes" 415. The paging device is identified in the device identifier field as "amspaging01" 412, and is coupled to pool identifier "Server-824-E8A-SN10FE401" 411. The stream identifier is, in this example, "123456" 413. A stream identifier is a handle used to associate the elements of a specific function. In this case, a paging device stream identifier is used to associate a paging request with a particular paging device. The paging device state of the paging device is "active" 414 and the storage type of the paging device is "physical volume" 416. It is appreciated that a literal string "yes" is just an example of a form the data that signifies the status of a redundant paging partition. Accordingly, many other data representations may signal the equivalent state, for example, a bit set to a predetermined value to represent redundancy in the data processing system. Similarly, a constant may suffice to describe a corresponding storage type in a field representing storage type. Accordingly, one of ordinary skill in the art would recognize that alternative expressions of "logical volume" may be used, without departing from the spirit and scope of the illustrative embodiments. In the example record 420 of paging device "amspaging01", the paging partition, is identified as part of a redundant set of paging partitions with "no" 425. The paging device is identified in the device identifier field as "amspaging01" 422, and is coupled to pool identifier "Server-824-E8A-SN10FE402" 421. The stream identifier is, in this example, "123458" 423. A stream identifier is a handle used to associate the elements of a specific function. In this case, a paging device stream identifier is used to associate a paging request with a particular paging device. The paging device state of the paging device is "active" 424 and the storage type of the paging device is "logical volume" 426.

A user may assign a memory weight to a first stream identifier. This assignment may be accomplished in a combination of steps. First, the user explicitly assigns the memory weight to the partition. Second, the memory weight is implicitly or indirectly assigned by virtue of the binding (explained below) of the partition and a paging device/stream identifier. A memory weight is a priority, relied on by the hypervisor, to prioritize paging requests assigned a higher memory weight over paging requests assigned a lower memory weight. A paging request assigned a lower memory weight may be enqueued while the hypervisor processes those paging requests having a higher memory weight. A memory weight of, for example, 1 may be assigned to high priority paging requests, while a memory weight of, for example, 0, may be assigned to low priority paging requests. A user may, indirectly, assign a second memory weight to a second stream identifier. The second stream identifier may be coupled to another paging device. Later, during production operation of the data processing system, the hypervisor may receive a paging request identifying the first stream identifier. Concurrent with receiving the first paging request, the hypervisor may receive a second paging request identifying the second stream identifier. Responsive to receiving these paging requests, the hypervisor may select from the first paging request and the second paging request a paging request for handling first. Such a selection may be based on the first memory weight and the second memory weight. That is, a paging request having a higher memory weight will be given the higher priority by the hypervisor. Each disk 331-336 of FIG. 3 is associated with a unique stream identifier, in this case, stream identifiers 351-356.

Figures 5A, 5B:
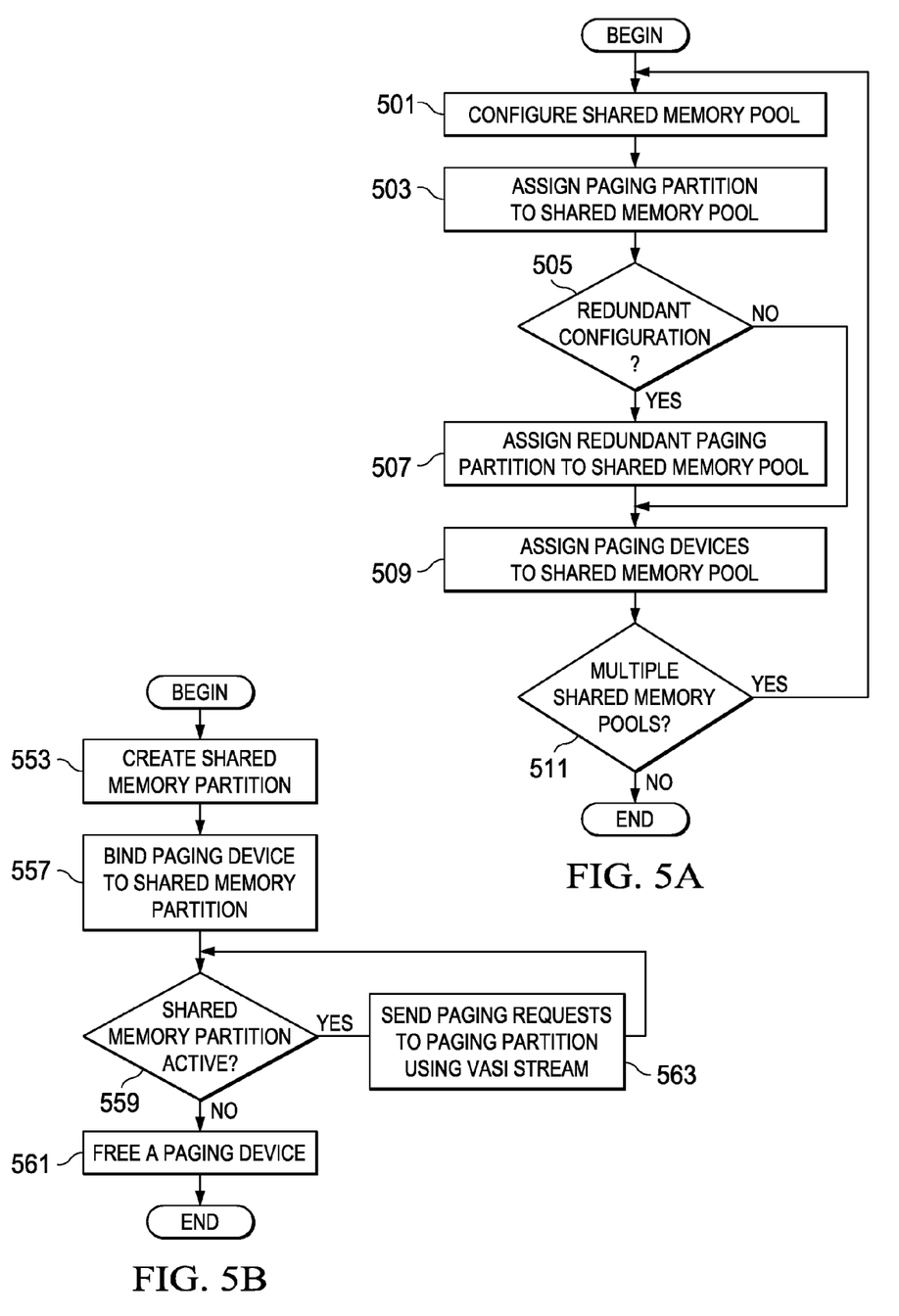
FIG. 5A is a flowchart for configuring the software components in a virtualized data processing system in accordance with an illustrative embodiment of the invention.
FIG. 5B is a flowchart for handling active and/or standby shared memory partitions in accordance with an illustrative embodiment of the invention.

FIG. 5A is a flowchart for configuring the software components in a virtualized data processing system in accordance with an illustrative embodiment of the invention. Processing begins with a virtualization control point (VCP) configuring a shared memory pool (step 501) in response to a user's request sent through the system management interface. The VCP may be, for example, VCP 201 of FIG. 2. The VCP may configure the shared memory pool by communicating with a hypervisor. User entries for configuring the shared memory pool are explained further below, with reference to FIG. 6.

Next, the VCP may assign a paging partition to a shared memory pool (step 503). Such an assignment may be based on a user's request or other input by a user. The paging partition can be, for example, paging partition 321 of FIG. 3. The shared memory pool can be, for example, shared memory pool 311 of FIG. 3. The user dialog that provides the user instruction for this step may be as described in FIG. 7 below. The VCP makes this assignment by sending a data structure using an interface between the hypervisor and the VCP. This structure can include the pool identifier, pool size, paging VIOS partitions assigned to the pool, and shared memory partitions associated with the pool. Next, a user may request a redundant assignment of paging partitions to the shared memory pool. A redundant assignment is an assignment and cooperation of at least two paging partitions with a single shared memory pool. Accordingly, the VCP may determine that a redundant configuration is selected (step 505). A positive determination at step 505 results in the VCP assigning a redundant paging partition to the shared memory pool (step 507). Otherwise, a negative determination skips step 507 and continues at step 509.

Next, the VCP may assign paging devices to a shared memory pool (step 509). The VCP may perform this step by adding data to the data structure 410 of FIG. 4. In particular, a user may provide configuration data to VCP according to a user interface described further in relation to FIG. 8. A sub-step to step 509 can include the VCP assigning a unique paging device stream identifier to each paging device assigned to the shared memory pool.

Next, the VCP may determine if a user has indicated to configure multiple shared memory pools (step 511). A determination that multiple shared pools are to be configured results in the VCP repeating step 501 with respect to a second and other additional shared memory pools. The data processing system that hosts the VCP continues by repeating at least steps 503, 505, 509, and 511. A negative determination at step 511, results in the data processing system terminating the process.

FIG. 5B is a flowchart for handling active and/or standby shared memory partitions in accordance with an illustrative embodiment of the invention. Initially, a user may instruct the VCP to create a shared memory partition (step 553). A shared memory partition can be, for example, shared memory partitions 231, 232, and 233 of FIG. 2. The VCP may perform this step by configuring a logical partition as a shared memory partition. A shared memory partition is a logical partition configured to use a shared memory pool using memory page loaning or cooperative memory over-commitment, as further described in U.S. patent application Ser. No. 12/135,286, titled "Mark Page-Out Pages As Critical For Cooperative Memory Over-Commitment". Next, the VCP binds or assigns a paging device to a shared memory partition (step 557). Next, the VCP determines if the shared memory partition is active (step 559). The user uses the VCP to "activate" a shared memory partition. When the user activates a shared memory partition, the data processing system binds a stream identifier to a paging device. The binding remains in place while the partition is active. The VCP may remove the binding, releasing or freeing the paging device, in response to the associated partition being shut down or deleted, if the paging device is needed for another partition. Once a shared memory partition is activated, the VCP transfers to the hypervisor configuration information for the shared memory partition that includes the stream identifier, the paging partition redundancy, the primary paging partition, and secondary paging partition, if any, for the shared memory partition, among others. A primary paging partition is the paging partition that is selected to be active. The secondary paging partition is the paging partition that is selected to be standby or non-active. If the VCP determines that the shared memory partition is active, the hypervisor directs the shared memory manager to send paging requests to the paging partition using a VASI stream (step 563). The VASI stream can be specified in the paging-device/stream-identifier data structure, which can be an object data management structure. The process may repeat at step 559 until the VCP determines the shared memory partition is not active.

If the shared memory partition is not active, the VCP may free a paging device (step 561). The VCP can free the paging device by removing any previous binding established for the paging device. Processing terminates thereafter.

Figure 6:
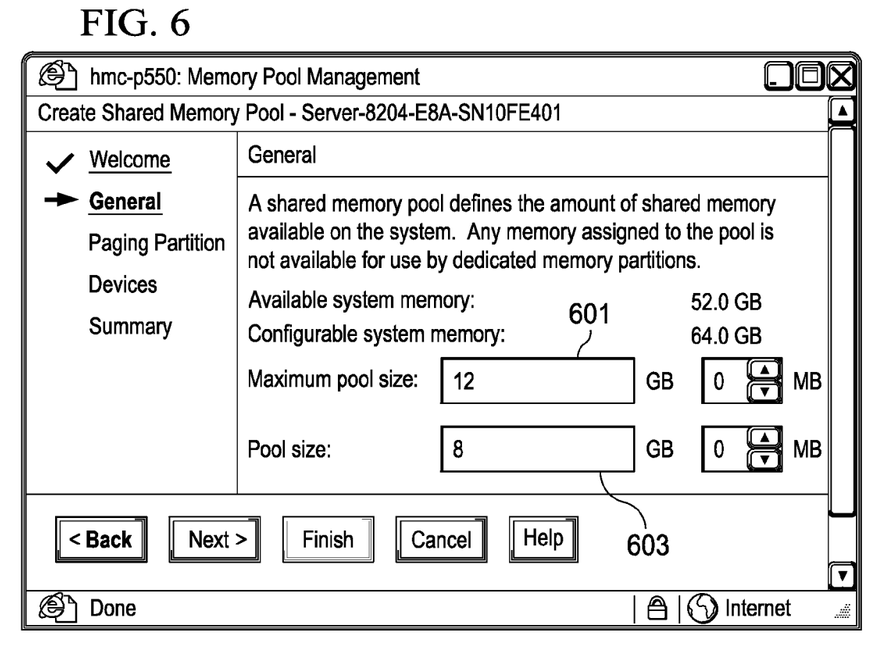
FIG. 6 is a user dialog box for receiving user configuration of shared memory pool in accordance with an illustrative embodiment of the invention.
Figure 7:
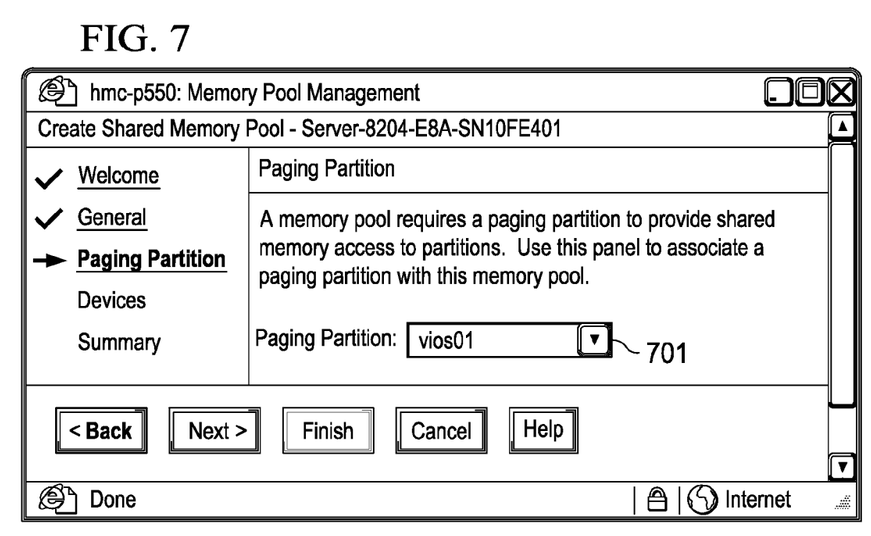
FIG. 7 is a user dialog box for assigning paging partitions to a pool in accordance with an illustrative embodiment of the invention.
Figure 8:
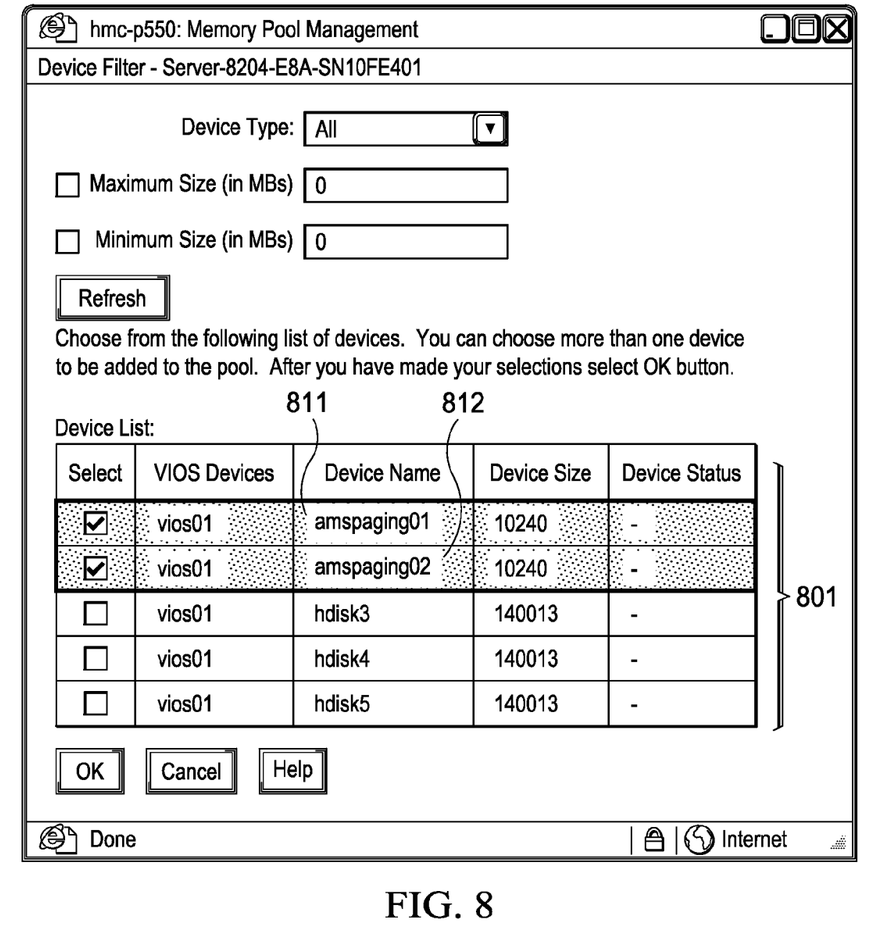
FIG. 8 is a user dialog box for assigning the paging device to the pool.

FIGS. 6-8 describe an exemplary set of dialog boxes that may provide, in part, a user interface to the VCP to perform the steps of FIG. 5A. A data system operator, or user, may as a preface to using the dialog boxes pictured in FIGS. 6-8, select a particular shared memory pool. Accordingly, as a legend at the top of each dialog box, the shared memory pool may be listed to provide a context for each dialog box. In these examples, the user is working with a shared memory pool named 8204-E8A-SN10FE401.

FIG. 6 is a user dialog box for receiving user configuration of shared memory pool in accordance with an illustrative embodiment of the invention. A user may allocate a subset of memory as a shared memory pool. In this example, a user has selected a shared memory pool named 8204-E8A-SN10FE401. The user allocates 12 GB as the maximum pool size for the shared memory pool. The user instruction is by way of entry to maximum pool size field 601. A user may further enter an initial pool size in pool size field 603. The VCP may respond to user submittal of such instructions by instructing the hypervisor to allocate a subset of physical memory to a shared memory pool, in the manner described in relation to step 501 in FIG. 5A, above.

FIG. 7 is a user dialog box for assigning paging partitions to a pool in accordance with an illustrative embodiment of the invention. A user, having previously selected a shared memory pool, can select a paging partition to associate with the shared memory pool. In this case, the user may choose a paging partition name from paging partition drop-down menu 701. FIG. 7 depicts the selected paging partition as "vios01".

FIG. 8 is a user dialog box for assigning the paging device to the pool. Each paging partition may have multiple paging devices established for it. Accordingly, a user may rely on device list 801 and individually check-off or otherwise select row entries that include the name of the paging device or paging devices that the user indicates the VCP should configure. In this example, the user selects amspaging01 row 811 and amspaging02 row 812 as paging devices to assign the shared memory pool. Step 509 of FIG. 5A further describes this step.

The illustrative embodiments permit a user to configure or establish at least one paging partition in a data processing system. Accordingly, one or more paging partitions may be assigned to support a shared memory pool. One or more paging devices, such as disks, may support each paging partition. Accordingly, a paging partition, once so configured, can handle paging requests of the shared memory pool. Thus, the paging partition can page-in or page-out, as directed in such paging requests, the data accessed to or from one or more disks. The Virtual I/O server is a partition trusted by the hypervisor that is used to enable sharing of physical I/O resources across partitions. By having the Virtual I/O server do the paging, the I/O support is decoupled from the hypervisor without compromising security. This reduces cost as different types of storage can be used as paging devices without changes to the hypervisor layer.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can store the program for use by or in connection with the instruction execution system, apparatus, or device.

The storage device can be an electronic, magnetic, optical, electromagnetic, infrared, or semiconductor system (or apparatus or device). Examples of a computer-readable storage device include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product for establishing at least one paging partition in a data processing system, the computer program product comprising: a computer readable storage device having computer usable program code stored thereon, the computer program product comprising:
    computer usable program code configured to reserve up to the subset of physical memory for use in the shared memory pool;
    computer usable program code configured to configure at least one logical partition as a shared memory partition;
    computer usable program code configured to assign a paging partition to the shared memory pool;
    computer usable program code configured to determine that a user requests a redundant assignment of the paging partition to the shared memory pool, wherein the paging partition is a partition trusted by a hypervisor, and the paging partition responds to paging requests without involvement of the hypervisor;
    computer usable program code configured to assign a redundant paging partition to the shared memory pool, responsive to a determination that the user requests a redundant assignment;
    computer usable program code configured to assign a paging device to the shared memory pool, wherein computer usable program code configured to assign the paging device to the shared memory pool comprises computer usable program code configured to assign at least one stream identifier to the paging device, wherein the paging device is assigned to the shared memory partition; and
    computer usable program code configured to transmit at least one paging request to a virtual asynchronous services interface configured to support a paging device stream.

2. The computer program product of claim 1, wherein computer usable program code configured to assign the paging partition to the shared memory pool further comprises computer usable program code configured to assign the virtual asynchronous services interface.

3. The computer program product of claim 1 further comprising:
    computer usable program code configured in response to paging requests from the hypervisor, to transfer data between the paging partition to the shared memory pool, wherein the paging partition provides data structure and functionality in support of the paging device stream.

4. The computer program product of claim 1, wherein the paging partition is trusted by a hypervisor executing on the data processing system.

5. The computer program product of claim 1, wherein computer usable program code configured to assign the paging device comprises:
    computer usable program code configured to configure at least one paging partition; and
    computer usable program code configured to assign a stream identifier to a paging device.

6. The computer program product of claim 5, wherein computer usable program code configured to configure the paging partition comprises:
    computer usable program code configured to configure a primary paging partition as an active paging partition; and
    computer usable program code configured to configure a second paging partition as a standby paging partition.

7. The computer program product of claim 6, wherein a first paging partition is assigned to a first shared memory pool and the second paging partition is assigned to a second shared memory pool.

8. The computer program product of claim 7 further comprising computer usable program code configured to receive a user selection to allocate a second subset of physical memory to a second shared memory pool.

9. The computer program product of claim 5, wherein a first paging partition and a second paging partition performs load balancing in response to paging requests from a shared memory manager.

10. A data processing system comprising:
    a bus;
    a storage device connected to the bus, wherein computer usable code is located in the storage device;
    a communication unit connected to the bus; and
    a processing unit connected to the bus, wherein the processing unit executes the computer usable code for establishing at least one paging partition in a data processing system, the processing unit further executes the computer usable code to reserve up to a subset of physical memory for use in a shared memory pool; configure at least one logical partition as a shared memory partition; assign a paging partition to the shared memory pool; assign a paging partition to the shared memory pool; determine that a user requests a redundant assignment of the paging partition to the shared memory pool; assign a redundant paging partition to the shared memory pool, responsive to a determination that the user requests a redundant assignment; assign a paging device to the shared memory pool, wherein the paging partition is a partition trusted by a hypervisor, and the paging partition responds to paging requests without involvement of the hypervisor wherein in executing the computer usable code to assign the paging device to the shared memory pool the processing unit executes computer usable code to assign at least one stream identifier to the paging device, wherein the paging device is assigned to the shared memory partition; and transmit at least one paging request to a virtual asynchronous services interface configured to support a paging device stream.

11. The data processing system of claim 10, wherein the processing unit in executing the computer usable code to assign the paging partition to the shared memory pool, executes the computer usable code to assign the paging partition to the shared memory pool responsive to an assignment of the paging partition to the shared memory pool.

* * * * *